(12) United States Patent
Kanasugi

(10) Patent No.: US 6,392,539 B1
(45) Date of Patent: *May 21, 2002

(54) OBJECT DETECTION APPARATUS

(75) Inventor: Katsumi Kanasugi, Saitama (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,700

(22) Filed: Jul. 7, 1999

(30) Foreign Application Priority Data

Jul. 13, 1998 (JP) .......................................... 10-197612

(51) Int. Cl.[7] ............................................. G08B 21/00
(52) U.S. Cl. ...................... 340/540; 340/575; 250/221
(58) Field of Search ............................... 340/540, 575, 340/576, 573.1; 250/221

(56) References Cited

U.S. PATENT DOCUMENTS

| 4,302,674 A | * | 11/1981 | Adachi et al. ............... 250/338 |
| 4,867,561 A | * | 9/1989 | Fuji et al. .................... 356/237 |
| 4,874,938 A | * | 10/1989 | Chuang ....................... 250/203 |
| 5,402,109 A | * | 3/1995 | Mannik ....................... 340/575 |
| 5,598,145 A | * | 1/1997 | Shimotani et al. .......... 340/576 |
| 5,635,905 A | * | 6/1997 | Blackburn et al. .......... 340/555 |
| 5,682,144 A | * | 10/1997 | Mannik ....................... 340/575 |
| 5,689,241 A | * | 11/1997 | Clarke, Sr., et al. ........ 340/575 |
| 5,895,910 A | * | 4/1999 | Christian ................. 250/208.2 |

FOREIGN PATENT DOCUMENTS

| JP | 7-35543 | 2/1995 |
| JP | 7-134800 | 5/1995 |
| JP | 8-159733 | 6/1996 |

* cited by examiner

*Primary Examiner*—Nina Tong
(74) *Attorney, Agent, or Firm*—Lahive & Cockfield, LLP

(57) ABSTRACT

Provided is an object detection apparatus, which includes a light emission device irradiating an object with light at a wavelength having less disturbance, and a light reception device including a filter that permits light having the aforementioned wavelength to pass, for receiving reflected light from the object. When the disturbance is sunlight, the light having a wavelength whereat the spectral radiative illuminance is damped is employed in accordance with the spectral characteristic of sunlight. In one embodiment, an object detection apparatus, which is mounted in a vehicle, employs, as an object, the eyes of a crew member in the vehicle, and obtains reflected images of the crew member's corneas and retinas to calculate the observed point viewed by the crew member.

3 Claims, 4 Drawing Sheets

OBJECT DETECTION APPARATUS

BACKGROUND OF THE INVENTION

1. Field of the Invention

The present invention relates to an object detection apparatus, with a light emission device and a light reception device, for employing the wavelength in a solar absorption zone in a light spectrum extending from a visible radiation band to a near-infrared radiation band.

2. Description of the Related Art

Several techniques have been proposed for employing light to calculate an observed point viewed by a crew member in a vehicle. Generally, a light emission device is used to irradiate the eyes of the crew member with a specific light beam, and a light reception device is used to receive images reflected by the crew member's retinas and corneas, so that the direction of the individual's line of sight can be determined and the observed point can be calculated. An observed point calculation device intended for use in a vehicle, which is disclosed in Japanese Unexamined Patent Publication No. Hei 7-35543, calculates the position of the observed point viewed by a vehicular operator, without any physical contact being required. This device calculates the observed point by employing the fact that when the eyes are irradiated by a near-infrared beam, the luminance of the reflected retinal image depends on the distance to the observed point of the eye. First, for calibration, an image of the eyeballs is recorded by a pickup camera each time an imaginary image at a predetermined distance is moved. Information concerning the images reflected by the retinas and the corneas is extracted from the obtained image data, and the brightness of the images reflected by the retinas is calculated and stored. At the next calculation performed for the observed location, the position of the observed point is calculated by using the brightness of the images reflected by the retinas, and the direction of the line of sight is calculated by using information obtained from the images reflected by both the corneas and the retinas. In this fashion, the calculation of the position of the observed point is performed.

According to this method, in the daytime, when the face or another portion of the head is irradiated directly or indirectly by sunlight, the sunlight acts as a disturbance, and an image obtained by the reflection of the beam that is radiated by the light emission member is blurred because of the adverse affect of the sunlight. That is, when the quantity of the incident light produced by sunlight having the same wavelength as that of a beam radiated by a light emission member is equal to or greater than the incident light produced by the beam produced by the light emission member, the S/N ratio (signal-to-noise ratio) is drastically deteriorated, and the reflected image obtained using the light from the target light emission member can not be identified by using the light reception results.

An operator pickup apparatus disclosed in Japanese Unexamined Patent Publication No. Hei 7-134800 can obtain clear reflected images from the retinas of an operator by providing device for limiting the above described disturbance. The disturbance restriction device, such as a band-pass filter (B.P.F; an optical filter), is located along an optical path connecting the operator and a light reception device, so that a clear retinal-reflection image can be obtained even in the presence of a strong disturbance. An adverse effect produced by a disturbance that has a wavelength other than that of the beam radiated by the light emission member can be attenuated by using a band-pass filter; however, a disturbance producing light having the same wavelength as the light radiated by the light emission member will be passed through the band-pass filter, and as a result, will cause deterioration of the S/N ratio.

In addition, an apparatus that is disclosed in Japanese Unexamined Patent Publication No. Hei 8-159733 can determine the direction of the line of sight while ensuring the eyes will not be injured in the presence of a strong disturbance. Since in the presence of a strong disturbance the pupils are constricted, accordingly, a greater quantity of light must be emitted, and as a result, a problem concerning the safety of the eyes has arisen. Therefore, the disclosed device precisely determines the direction of the line of sight even in the presence of a strong disturbance, while providing for the safety of the eyes. The eyes of an operator are irradiated by an infrared ray so that the radiant energy density is equal to or smaller than a safety reference value, and so that the peak pulse power of the a light emission device is inversely proportional to the operating speed of a shutter; so that a reflected image is picked up in order to extract a reflected retinal image and a reflected corneal image; and so that the direction of the line of sight of the operator can be calculated from the positions of the reflected images. While the adverse effects produced by a disturbance can be reduced by increasing the shutter operating speed and the peak light emission power, the S/N ratio is not drastically reduced. However, the affect on the eyes due to the addition of the large amount of pulse light is unknown.

As is described above, when, to ensure the S/N ratio, the quantity of emitted light is increased until it is equal to or greater than the amount of incident light that acts as a disturbance, as does sunlight, a problem has arisen concerning the safety of the eyes when they are subjected to irradiation. To protect the eyes, a standard has been established to ensure that when the light emitted by an emission source is within a near-infrared irradiation band, its intensity should not exceed a recommended value of "10 $mW/cm^2$," as determined at a U.S. Labor Safety Conference. When the light emitted by a light emission source is within a visible radiation band, an operator may be dazzled by emitted light that exceeds the light beam in quantity and the operator's eyes may be adversely affected.

SUMMARY OF THE INVENTION

It is, therefore, one object of the present invention to detect the state of an object at a high S/N ratio. It is another object of the present invention to provide an apparatus that is friendly to the eyes when detecting the line of sight.

To achieve the above objects, according to the invention, an object detection apparatus for detecting the state of an object includes: a light emission device irradiating an object with a light beam at a wavelength that produces less disturbance; and a light reception device including a filter through which to pass the light beam at the wavelength, and receiving a light beam reflected from the object. With this arrangement, the light emission device emits light at a wavelength that produces less disturbance, and the light is received by the light reception device after passing through the filter so that the state of the object can be precisely detected without the process being affected by any disturbance.

Disturbance is changed to noise when a reflected light is received, and in the daytime, sunlight acts as a representative disturbance. At night, all the lights in a town, such as the lights of cars, neon signs, or lights in shops and houses, act as disturbances.

In the above object detection apparatus, sunlight may act as the disturbance. That is, detection of the object is performed by using a light at a wavelength that has the low spectral radiative illuminance of the spectrum of sunlight. With this arrangement, sunlight at a wavelength other than that used for the detection of an object has no effect on the detection operation, and therefore, even in the daytime the state of the object can be precisely detected.

Further, in the above object detection apparatus, the object may be the eyes of an operator, and the object detection apparatus may be mounted on a vehicle so as to obtain reflected images from the retinas and the corneas of the eyes and to thus calculate an observed point viewed by the operator. With this arrangement, preferred reflected images of the retinas and corneas can be obtained, and the observed point viewed by the operator can be accurately calculated.

In addition, according to the above object detection apparatus, the wavelength may be a wavelength in a non-visible irradiation band. With this arrangement, since flicker due to light from the light emission device can be prevented, for example, when the detection apparatus is used at night, the state of an object can be detected without causing the eyes of a human being to be distressed.

Further, in the above object detection apparatus, the wavelength may be one of a plurality of wavelengths producing less disturbance. That is, since sunlight includes a plurality of wavelengths for which the spectral radiative illuminance is quite low, one of the wavelengths is selected in accordance with the environment in which the invention is employed. With this arrangement, since the environment is taken into consideration when a wavelength is selected, the state of an object can be precisely detected in accordance with the environment.

Moreover, the wavelength may be selected from a visible irradiation band in the daytime and from a non-visible irradiation band at night. With this arrangement, since wavelengths can be selected that are appropriate for the environmental conditions encountered in the daytime and at night, the state of an object can be accurately detected both in the daytime and at night.

DETAILED DESCRIPTION OF THE PREFERRED EMBODIMENT

Figure 1:
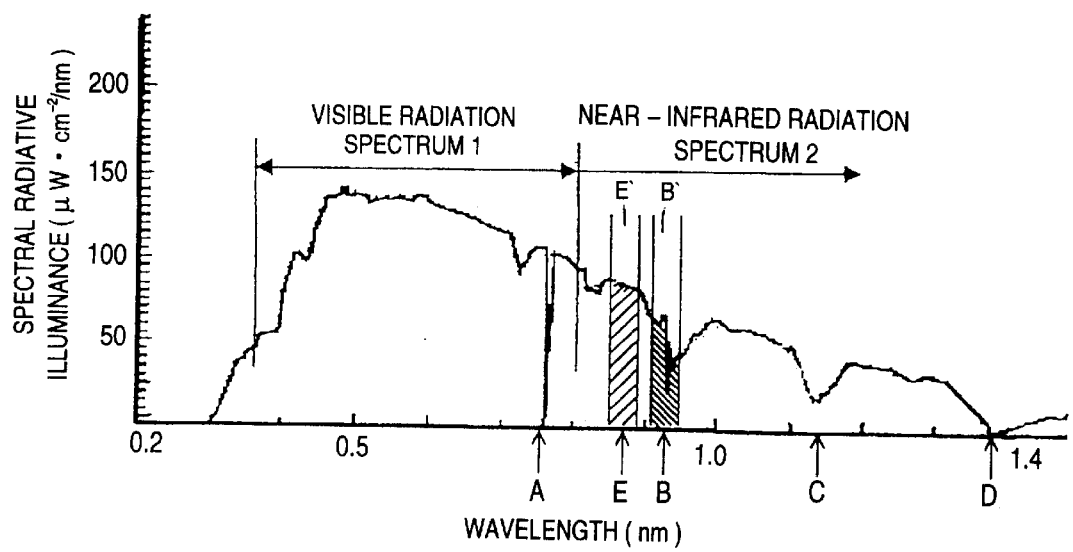
FIG. 1 is a graph showing a light spectral characteristic of standard sunlight in a standard atmosphere.

FIG. 1 is a diagram showing the general solar spectrum. This is a solar spectrum characteristic described in the "Solar Battery Handbook" (by the Electric Institution). The horizontal axis represents the wavelength element of sunlight, and the vertical axis represents the spectral radiative illuminance, i.e., the radiation intensity per 1 $cm^2$. Therefore, FIG. 1 shows the intensity (energy) of a radiated beam for a wavelength element. As is shown in FIG. 1, the light is roughly divided at a wavelength of 0.75 $\mu$m to 0.77 $\mu$m into a visible radiation spectrum 1 and a near-infrared radiation spectrum 2. The visible beam has a wavelength of 0.4 $\mu$m to 0.77 $\mu$m, and the near-infrared beam has a wavelength of 0.75 $\mu$m to 2.5 $\mu$m. In the wavelength area shown in FIG. 1, the light having the highest spectral radiative illuminance is a green area that has a wavelength of about 0.58 $\mu$m.

It is apparent from FIG. 1 that at specific wavelengths, sunlight is strongly damped (points A, B, C and D in FIG. 1). The wavelength at point A in FIG. 1 is 0.761 $\mu$m to 0.762 $\mu$m, and belongs to the visible radiation area 1. The spectral radiative illuminance at point A is substantially reduced and is near 0. This is approximately $\frac{1}{10}$, or less, of the spectral radiative illuminance of the green area, and it feels dark, even in the daytime. The damping of the sunlight at point A occurs because nearby wavelengths are absorbed by the oxygen in the atmosphere. The amount that is absorbed is substantially constant, depending on the density of the oxygen in the air.

Points B, C and D in FIG. 1 belong to the near-infrared radiation area that human beings can not see. The wavelengths at points B, C and d are 0.934 to 0.935 $\mu$m, 1.13 $\mu$m, and 1.34 to 1.44 $\mu$m, respectively. At point B, the radiation energy is approximately $\frac{1}{5}$, or less, of the spectral radiative illuminance in the green area. At points C and D, the damping rates are approximately 50 to 100% of the spectral radiative illuminance in the green area. The damping of the sunlight at points B, C and D occurs because nearby wavelengths are absorbed by water vapor in the air. Therefore, the amount to which sunlight is absorbed varies somewhat in consonance with the precipitable water content of the air, which normally varies, depending on climatic conditions, fluctuates within a range extending from 5 mm to 50 mm. The damping of the sunlight that occurs at points B, C and D is in proportion to the precipitable water content of the air, and the degree of damping can satisfy the above factors when the precipitable water content is at the lower limit of 5 mm.

The spectrum of sunlight has a feature that the spectral radiative illuminance is damped at a plurality of specific wavelengths. This means, substantially, that sunlight does not act as a disturbance at these specific wavelengths. Therefore, to detect an object, the object is irradiated with light containing the specific wavelengths at points A, B, C and D, and since an optical filter is employed that permits the passage of only these same wavelengths in reflected light, the S/N ratio in the detection process can be drastically improved. Further, in case that the object is the eyes, since a light in the wavelength containing less sunlight is irradiated to the eyes, the amount of radiation of the eyes by the emission device need not be increased, and the eyes will not be adversely affected.

When the object is the eyes, light having the wavelengths at points C and D can not provide satisfactory reflected retinal images because the light reflectivity of the retinas is low, but such light can provide preferable reflected corneal images. Therefore, the wavelengths at point C and D can be employed to determine the positions of eyes, but are not appropriate for the determination of the line of sight.

Figure 2:
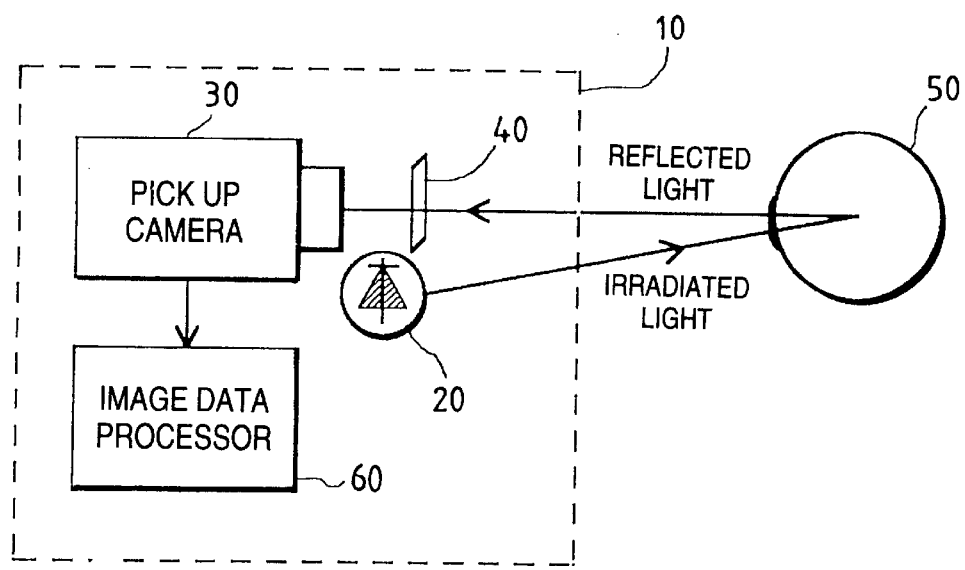
FIG. 2 is a block diagram illustrating an object detection apparatus according to one embodiment of the present invention.

FIG. 2 is a diagram showing an object detection apparatus 10 according to one embodiment of the present invention.

The object detection apparatus 10 includes a light-emitting diode (LED) 20, a pickup camera 30, an optical filter 40, and an image data processor 60.

The light-emitting diode 20 is a diode that emits light at a wavelength where the spectral radiative illuminance of sunlight is damped. This wavelength corresponds to a wavelength of 0.76 μm (A) in the visible radiation spectrum 1 in FIG. 1, or to a wavelength of 0.94 μm (B) in the near-infrared radiation spectrum 2. A diode having a predetermined wavelength that is available on the market is employed as the light-emitting diode 20. The object detection apparatus 10 may include only a light-emitting diode that emits light at wavelength A, or it may also include an additional diode that emits light at wavelength B, in which case the diodes may be switched in accordance with the environment in which employed. Wavelength A is ideal because at that wavelength the damping of the illuminance of sunlight is the strongest; however, as this wavelength belongs to the visible radiation spectrum, it may at a dark environment such as at night, be undesirable, since in the dark environment it appears as red. In this case, if the object detection apparatus 10 has two light-emitting diodes, the diodes can be switched in the daytime and at night to solve the above problem.

The pickup camera 30 is a CCD camera having a function that an image signal is generated upon the receipt of the light reflected by an object to be picked up. The optical filter 40 is located in front of the CCD and permits only specific wavelengths to pass.

The optical filter 40 may be applied as a coating on the surface of the CCD, or it may be a separate member that is located in front of CCD. When the object detection apparatus 10 includes two light-emitting diodes 20 having different wavelengths, two optical filters, corresponding respectively to the two wavelengths, are provided, and in use are switched in unison with their respective light-emitting diodes. Such an optical filter can be one available on the market that has a predetermined central wavelength and a predetermined half-width. In this embodiment, for example, one of the optical filters that is employed has a central wavelength of 0.76 μm and a half-width of 5 nm, while the other has a central wavelength of 0.94 μm and a half-width of 10 nm.

The image data processor 60 is mounted in the object detection apparatus 10 to obtain the observed point of an eye 50. Light that is projected onto the eye 50 by the light emitting diode 20 is reflected by the cornea and the retina of the eye 50. The reflected light is routed through the optical filter 40, which selects and permits only light having a wavelength of 0.76 μm to pass, and is transmitted to the pickup camera 30. The pickup camera 30 uses the received light to generate an image signal, and transmits the signal to the image data processor 60 of the object detection apparatus 10.

Figure 3:
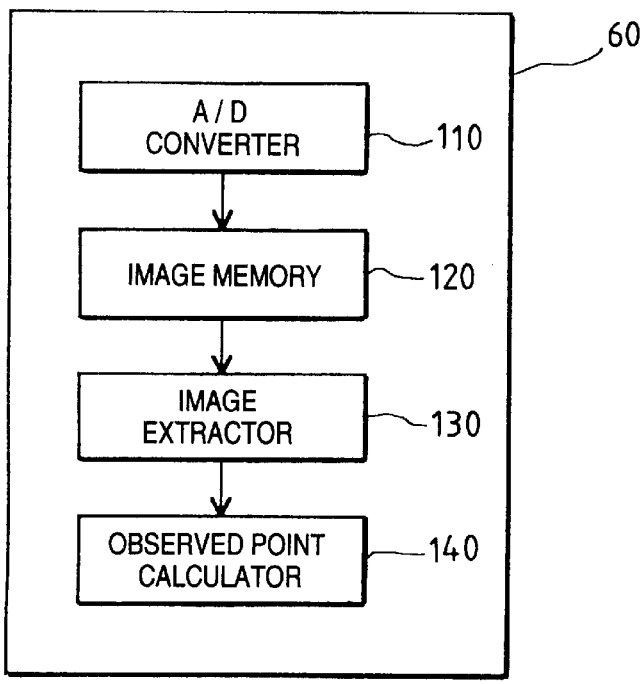
FIG. 3 is a block diagram illustrating the mechanical structure of an image data processor.

FIG. 3 is a block diagram illustrating the functional arrangement of the image data processor 60. An image signal from the pickup camera 30 is converted by an A/D converter 110 into a digital signal. The digital signal is then stored as x and y coordinate data in an image memory 120. An image extractor 130 extracts a cornea reflected image $(x_1, y_1)$ and a retina reflected image $(x_2, Y_2)$ from the coordinate data. Then, an observed point calculator 140 determines the direction of the line of sight, based on the extracted coordinates of the reflected corneal and retinal images, and calculates the observed point.

Figure 4:
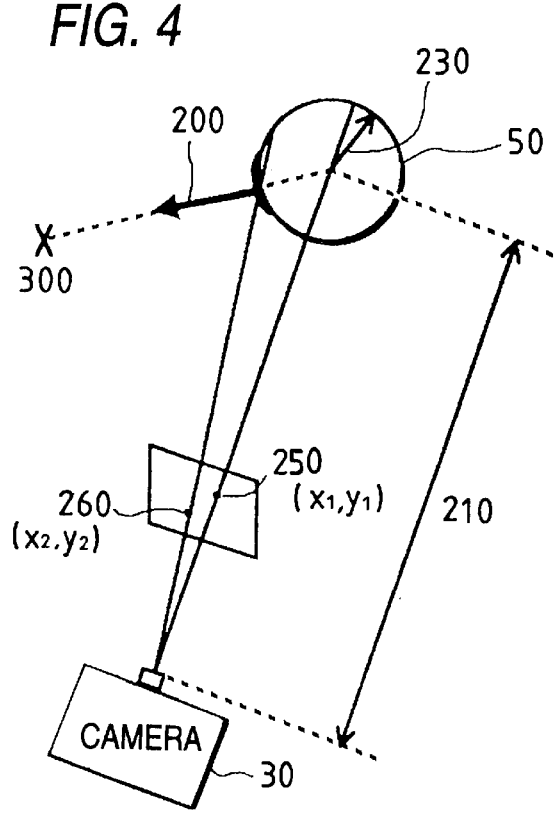
FIG. 4 is a diagram showing the calculation of the direction of the line of sight and an observed point.

A description will be given of the method used for calculating the direction of the line of sight and an observed point with reference to FIG. 4. In the above described manner, the image extractor 130 in the image data processor 60 extracts coordinates $(x_1, y_1)$ of a reflected corneal image 250 and coordinates $(x_2, y_2)$ of a reflected retinal image 260. The location of the pickup camera 30 is established in advance, and it is known that the size of an eye 50 of an adult is approximately constant and that the radius 230 of the eye 50 is about 4.2 mm. These data and a distance 210 from the pickup camera 30 to the eye 50 which is calculated can be used to perform a simple calculation to obtain the position of the cornea of the eye 50 and the center position of the eye 50. A vector 200 in the direction of the line of sight is calculated using the position of the cornea and the center position of the eye 50 that are obtained. An observed point 300 can be calculated from the direction of the line of sight 200 and the distance between the eye 50 and the observed point 300, and the distance to the observed point 300 can be acquired from, for example, the luminance of the retina reflected image 260.

As is described above, according to this embodiment, since a light-emitting diode that emits light at a wavelength at which the spectral radiative illuminance is greatly damped, and an optical filters that permits only light at such a wavelength to pass are employed to obtain a clear reflected image, the observed point of a crew member in a vehicle can be easily obtained, and the line of sight, and whether the crew member is asleep, can easily be detected. In addition, since the wavelength is changed in accordance with the environment, the state of an object can be preferably detected in accordance with the environment.

Further, in this embodiment, the images reflected by the eyes of a crew member in a vehicle are obtained. However, the invention is applied to a case that the state of another object can be detected by irradiating it with light having a wavelength which produces only a small disturbance and by acquiring the reflected image. For example, assuming that the object is a specific mobile member, the moving state of the specific mobile member can be detected.

Figure 5:
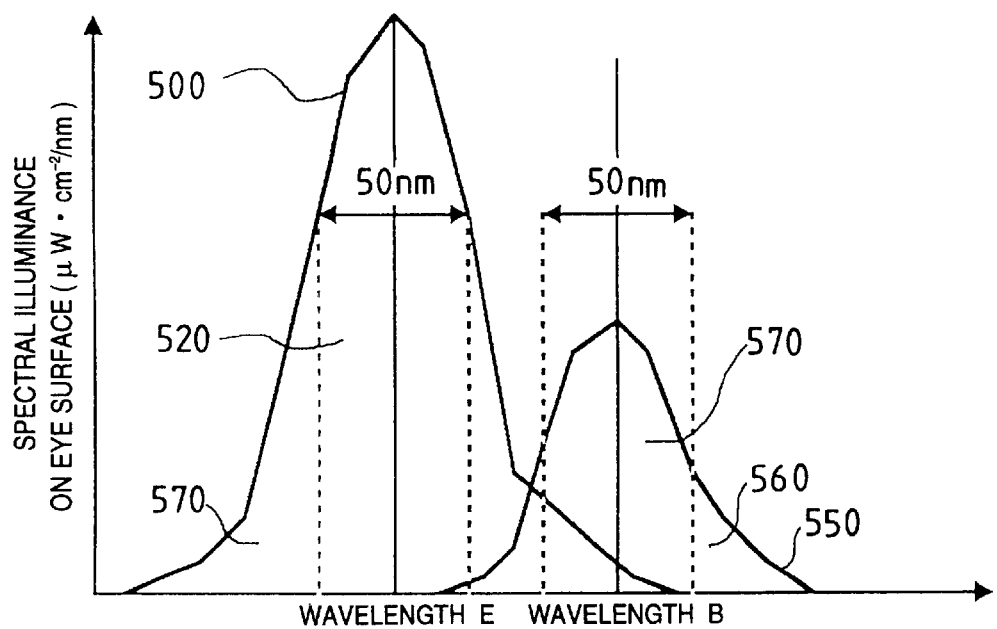
FIG. 5 is a graph showing the spectral illuminance characteristic on the surface of an eye of light emitted by a light-emitting diode.

FIG. 5 is a graph showing the spectral illuminance characteristic of the light with which a light-emitting diode irradiates the eyes of the operator of a vehicle in order to detect the operator's line of sight. The vertical axis represents the spectral illuminance at the surface of the eye, i.e., the intensity, on the surface of the eye, of the light emitted by the light-emitting diodes; and the horizontal axis represents the wavelength. In this instance the wavelengths E and B correspond to those at points E and B in FIG. 1. A curve 500 represents the spectral illuminance characteristic of the light at the surface of the eye, at point E in FIG. 1, with which a light-emitting diode having the wavelength E should irradiate the eye in order to detect the line of sight under the illuminance provided by sunlight. An area 510, which is defined by the curve 500 and the horizontal axis representing the wavelength, represents the total quantity of spectral illuminance at the eye, i.e., the illuminance on the surface of the eye, when the eye is irradiated by a light-emitting diode having wavelength E. An area 520 is the portion of the area 510 that corresponds to a half-width of 50 nm.

A curve 550 represents the spectral illuminance characteristic of the light at the surface of the eye, at point B in FIG. 1, with which the light-emitting diode having the wavelength B should irradiate the eye in order to detect the line of sight under the illuminance provided by sunlight. An area 560, which is defined by the curve 550 and the horizontal axis, represents the illuminance at the surface of the eye when the eye is irradiated by the light-emitting diode having the wavelength B. An area 570 is the portion of the area 560 that corresponds to a half-width of 50 nm.

As is apparent from the graph, the spectral illuminance characteristic of the curve 500 is greater as a whole than that of the curve 550. As is apparent from FIG. 1, since sunlight is damped less at wavelength E and acts as a disturbance, the illuminance indicated by the curve 500 is required in order to obtain the image reflected by the object. Since sunlight is strongly damped at wavelength B, the reflected image can be obtained without increasing the illuminance as for wavelength E. Following this, an explanation will be given concerning how eyes are affected in accordance with differences in the illuminances of the wavelengths.

Figure 6:
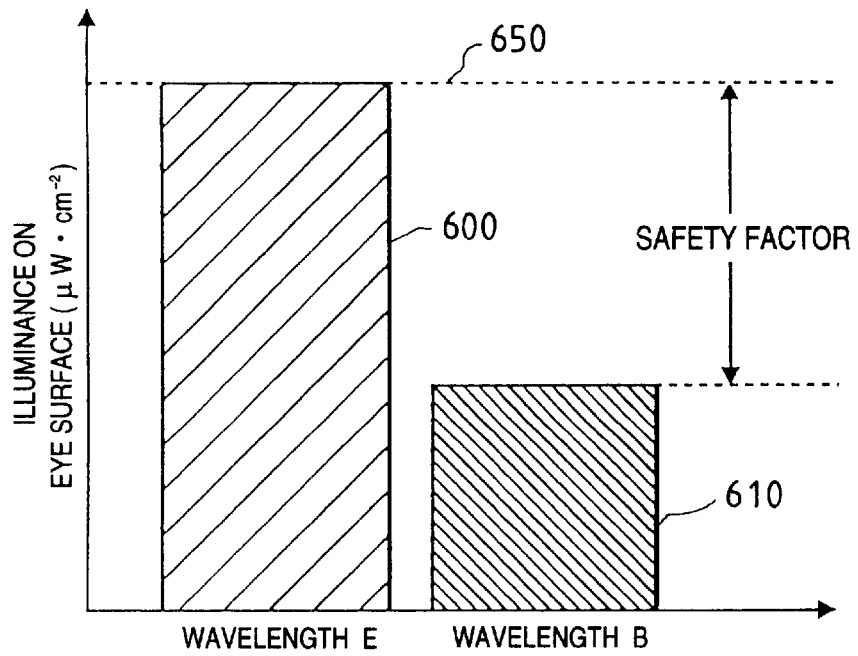
FIG. 6 is a graph showing the illuminance characteristic on the surface of an eye of light emitted by a light-emitting diode.

FIG. 6 is a bar graph showing the illuminance characteristic of light, produced by the light-emitting diode, on the surface of the eye. The vertical axis represents the illuminance on the surface of the eye, i.e., the light intensity emitted at the eye. Wavelengths E and B along the horizontal axis correspond to wavelengths E and B in FIG. 5. A graph bar 600 shows the degree of the illuminance, which that is obtained by integrating the spectral illuminance of the curve 500 in FIG. 5, on the surface of the eye of light having wavelength E. Similarly, a graph bar 610 shows the degree of the illuminance, which is obtained by integrating the spectral illuminance of the curve 550, on the surface of the eye of light having wavelength B. An illuminance safety reference 650 is used to indicate the advisory value of 10 mW/cm$^2$ determined at the U.S. Labor Safety Conference. The "safety factor" is the difference between the illuminance safety reference of 10 mW/cm$^2$, which is indicated by the illuminance safety reference 650, and the illuminance on the surface of the eye.

As is apparent from FIG. 6, an illuminance 600 on the surface of the eye of light having wavelength E substantially reaches the illuminance safety reference 650, while an illuminance 610 on the surface of the eye of light having wavelength B is considerably below the reference 650. Therefore, the safety factor for the eye due to the light having wavelength B is high, and the safety factor due to the light having wavelength E is quite low. As is described above, when the eyes are irradiated by light having a wavelength at which sunlight is damped less, high illuminance is required to detect a signal, so that the illuminance reaches the safety reference and adversely affects the eyes. Whereas, when eyes are irradiated by light having a wavelength at which sunlight is strongly damped, the disturbance is small and high illuminance is not required, and thus, the illuminance is sufficiently below the safety reference so that it does not affect the eyes.

Figure 7:
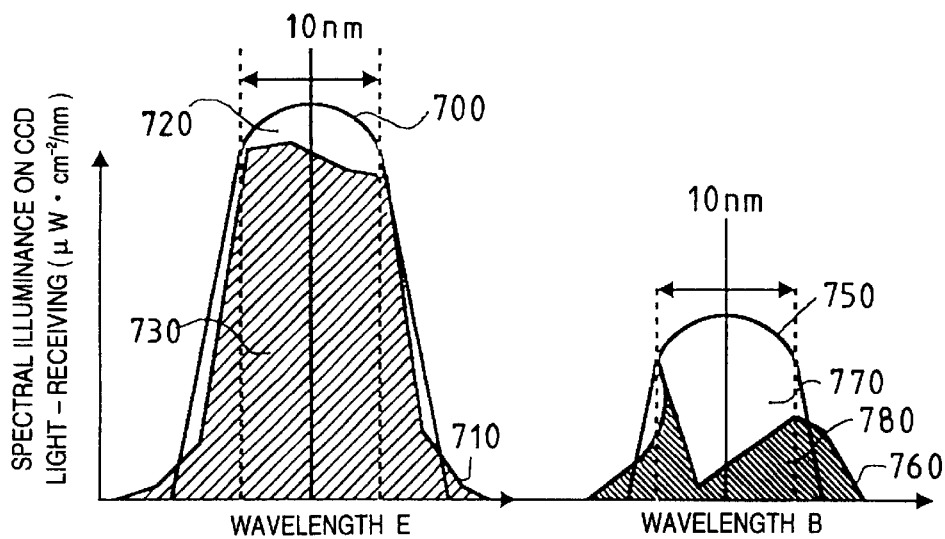
FIG. 7 is a graph showing the spectral illuminance characteristic on the light-receiving face of a CCD after light emitted by a light-emitting diode and a sunlight have been passed through an optical filter.

FIG. 7 is a graph showing the spectral illuminance characteristic on the light-receiving face of the CD after light from the light-emitting diode and sunlight have passed through the optical filter. The vertical axis represents the spectral illuminance on the light-receiving face of the CCD, i.e., represents the intensity of light with which the CCD is to be irradiated. Wavelengths E and B along the horizontal axis correspond to the wavelengths at points E and B in FIG. 1. A curve 700 shows the illuminance characteristic at the CCD light-receiving face when the light from the light-emitting diode having wavelength E passes through the optical filter having transmission wavelength E. A curve 710 shows the illuminance characteristic at the CCD light-receiving face when sunlight passes through the optical filter having transmission wavelength E. A portion that is surrounded by the curve 710 and the horizontal axis (shaded portion on the left in FIG. 7) corresponds to the shaded portion at wavelength E' for sunlight in FIG. 1. For the optical filter employed here, the central wavelength to be passed through is wavelength E and the half-width is 10 nm. An area 720 is the portion which corresponds to the half-width portion of the area defined by the curve 700 and the horizontal axis, and an area 730 corresponds to the half-width portion of the shaded portion surrounded by the curve 710.

A curve 750 shows the illuminance characteristic at the CCD light-receiving face when light from the light-emitting diode having wavelength B passes through the optical filter having transmission wavelength B. A curve 760 shows the illuminance characteristic at the CCD light-receiving face when sunlight passes through the optical filter having transmission wavelength B. A portion that is surrounded by the curve 760 and the horizontal axis (shaded portion on the right in FIG. 7) corresponds to the shaded portion at wavelength B' for sunlight in FIG. 1. For the optical filter employed here, the central wavelength to be passed through is wavelength B and the half-width is 10 nm. An area 770 is the portion which corresponds to the half-width portion of the area defined by the curve 750 and the horizontal axis, and an area 780 corresponds to the half-width portion of the shaded portion defined by the curve 760.

Figure 8:
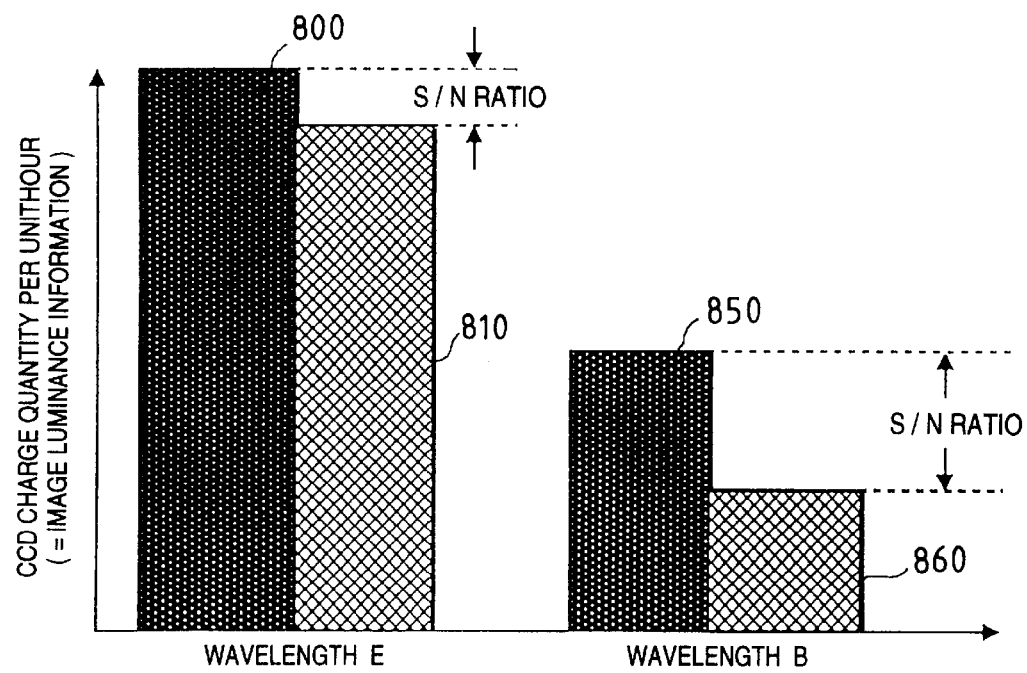
FIG. 8 is a graph showing the illuminance characteristic on the light-receiving face of the CCD.

FIG. 8 is a graph showing the illuminance characteristic on the light-receiving face of the CCD. The vertical axis represents the illuminance at the light-receiving face of the CCD that corresponds to the quantity of CCD charges for the hour unit. Wavelengths E and B along the horizontal axis correspond to wavelengths E and B in FIG. 7. The S/N ratio in FIG. 8 represents the difference between the illuminance of light from the light-emitting diode on the CCD light-receiving face and the illuminance of sunlight on the CCD light-receiving face. A graph bar 800 shows the results obtained by integrating the curve 700 in FIG. 7, and represents the degree of the illuminance of light that the CCD-light receiving face receives from the light-emitting diode having wavelength E via the optical filter having transmission wavelength E. A graph bar 810 shows the results obtained by integrating the curve 710 in FIG. 7, and represents the degree of the illuminance of light that the CCD-light receiving face receives from sunlight via the optical filter having transmission wavelength E. Similarly, a graph bar 850 shows the results obtained by integrating the curve 750 in FIG. 7, and represents the degree of the illuminance of light that the CCD-light receiving face receives from the light-emitting diode having wavelength B via the optical filter having transmission wavelength B. A graph bar 860 shows the results obtained by integrating the curve 760 in FIG. 7, and represents the degree of the illuminance of light that the CCD-light receiving face receives from sunlight via the optical filter having wavelength B.

As is apparent from FIG. 8, at wavelength E the ratio of the illuminance of sunlight to the illuminance of light emitted by the light-emitting diode is high so that sunlight acts as a disturbance and adversely affects the eyes, and as a result, the S/N ratio is quite low. That is, it is apparent that at wavelength E the S/N ratio is quite low even if the illuminance is at the limit established by the safety reference (FIG. 6). On the other hand, it is found that at wavelength B the ratio of the illuminance of sunlight to the illuminance of light emitted by the light-emitting diode is quite low so that sunlight does not act as a disturbance and does not adversely affect the eyes, and as a result, the S/N ratio is improved. That is, it is apparent that at wavelength B the S/N ratio can be considerably improved while the illuminance relative to the limit established by the safety reference (FIG. 6) is satisfactory.

As is described above, since sunlight is radiated at a wavelength that can be absorbed, and only light having that wavelength is permitted to pass through the optical filter, the S/N ratio can be very high. Therefore, according to the present invention, the state of an object can be detected at a high safety factor and a high S/N ratio.

Further, sunlight has been employed as a representative disturbance. However, even when a disturbance results from a light source other than the sun, such as the headlights of a car, a fluorescent lamp or a neon sign in a town, when light at a wavelength that is accompanied by less disturbance is employed, the state of an object can be detected at a high S/N ratio.

According to the present invention, since the light emission device emits light at a wavelength accompanied by less disturbance, and the light reception device receives that light though a filter, the state of an object can be preferably detected without being affected adversely by a disturbance. Further, since sunlight at a wavelength other than that used for the detection of an object is not related to the detection process, the state of an object can be preferably detected even in the daytime.

In addition, since clear reflected images of the corneas and retinas are obtained, the observed point viewed by a crew member can be calculated more precisely and more safely. And, since flicker due to light from the light emission device is prevented during night use, the state of an object can be satisfactorily detected without distressing the eyes of a person.

Since the wavelength is selected in accordance with the environment, the state of an object can be preferably detected in accordance with the environment. Further, since the wavelength is selected in accordance with the environment in the daytime and at night, the state of an object can be satisfactorily detected throughout the day.

The present disclosure relates to the subject matter contained in Japanese patent application No. Hei. 10-197612 filed on Jul. 13, 1998 which is expressly incorporated herein by reference in its entirety.

While only certain embodiments of the invention have been specifically described herein, it will apparent that numerous modifications may be made thereto without departing from the spirit and scope of the invention.

What is claimed is:

1. An object detection apparatus for detecting the states of an eye of an operator, said object detection device comprising:
   a light emission device which includes at least two emitters for selectively operating either one of said emitters for emitting light at a visible wavelength of approximately 0.76 $\mu$m with nearly no sunlight disturbance or a non-visible light wavelength of approximately 0.94 $\mu$m with nearly no sunlight disturbance, to the eye of the operator;
   a camera which includes a light reception device for receiving reflected light from the eye of the operator;
   a filter for allowing light to pass through at the wavelength; and
   an image processor for analyzing the filtered light to determine the state of the eye of the operator.

2. An object detection apparatus mounted on a vehicle comprising:
   a light emission device which includes at least two emitters for selectively operating either one of said emitters for emitting light at a visible wavelength of approximately 0.76 $\mu$m with nearly no sunlight disturbance or a non-visble light wavelength of approximately 0.94 $\mu$m with nearly no sunlight disturbance, to an eye of an operator;
   a camera which includes a light reception device for receiving reflected light from the eye of the operator;
   a filter for allowing light to pass through at the wavelength;
   a calculator module for calculating an observed point view by the operator upon said filtered light; and
   an image processor for analyzing the filtered light upon the calculated point to determine the state of the eye of the operator.

3. An object detection apparatus for detecting the states of an eye of an operator, said object detection device comprising:
   a light emission device which includes at least two emitters for selectively operating either one of said emitters for emitting light at a visible wavelength of approximately 0.76 $\mu$m with nearly no sunlight disturbance or a non-visble light wavelength of approximately 0.94 $\mu$m with nearly no sunlight disturbance, to the eye of the operator;
   a camera which includes a light reception device for receiving reflected light from the eye of the operator;
   a ratio module for detecting a signal to noise (S/N ratio) for the light at the wavelength;
   a filter for allowing light to pass through at said wavelength with a selected S/N ratio; and
   an image processor for analyzing the filtered light with said selected S/N ratio to determine the state of the eye of the operator.

* * * * *